United States Patent
Stewart (10) Patent No.: US 10,235,161 B2
(45) Date of Patent: Mar. 19, 2019

(54) TECHNIQUES OF ADDING SECURITY PATCHES TO EMBEDDED SYSTEMS

(71) Applicant: American Megatrends, Inc., Norcross, GA (US)

(72) Inventor: Joseph Stewart, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 26 days.

(21) Appl. No.: 15/425,348

(22) Filed: Feb. 6, 2017

(65) Prior Publication Data
US 2018/0225109 A1 Aug. 9, 2018

(51) Int. Cl.
G06F 9/45 (2006.01)
G06F 8/656 (2018.01)
G06F 9/445 (2018.01)
G06F 21/51 (2013.01)

(52) U.S. Cl.
CPC .......... *G06F 8/656* (2018.02); *G06F 9/44521* (2013.01); *G06F 21/51* (2013.01); *G06F 2221/033* (2013.01)

(58) Field of Classification Search
CPC .............. G06F 8/443; G06F 8/51–8/54; G06F 9/44521; G06F 21/00–21/75
USPC .................................. 717/146, 152
See application file for complete search history.

(56) References Cited

U.S. PATENT DOCUMENTS

| | | | | |
|---|---|---|---|---|
| 5,964,839 A * | 10/1999 | Johnson | .................. | G06Q 30/02 702/187 |
| 6,148,336 A * | 11/2000 | Thomas | .............. | H04L 41/0893 709/223 |
| 6,412,071 B1 * | 6/2002 | Hollander | ........... | G06F 12/1441 726/23 |
| 6,550,060 B1 * | 4/2003 | Hammond | .......... | G06F 9/44521 717/162 |
| 6,609,159 B1 * | 8/2003 | Dukach | ................. | G06F 9/5033 709/203 |
| 6,779,187 B1 * | 8/2004 | Hammond | .......... | G06F 9/44521 719/331 |
| 6,968,410 B2 * | 11/2005 | Bennett | ................... | G06F 13/24 710/260 |
| 7,111,279 B2 * | 9/2006 | Gazdik | ................. | G06F 9/4486 717/110 |
| 7,127,713 B2 * | 10/2006 | Davis | ................. | H04L 63/0227 717/177 |
| 7,406,533 B2 * | 7/2008 | Li | .......................... | H04L 69/16 370/395.52 |

(Continued)

OTHER PUBLICATIONS

Niek Oost. Binary code analysis for application integration. Sep. 2, 2008.*

*Primary Examiner* — Francisco J Aponte (74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be an embedded-system device. The embedded-system device intercepts a call to a target function in a system dynamic library. The embedded-system device invokes an intermediate function in an intercept dynamic library and corresponding to the target function. The embedded-system device refrains from calling the target function or calling the target function with one or more modified parameters.

11 Claims, 4 Drawing Sheets

(56) References Cited

U.S. PATENT DOCUMENTS

| | | | | |
|---|---|---|---|---|
| 7,530,076 B2* | 5/2009 | Underseth | G06F 8/30 | 719/310 |
| 7,653,900 B2* | 1/2010 | Kinderknecht | G06F 9/44521 | 717/163 |
| 7,703,081 B1* | 4/2010 | Buches | G06F 21/52 | 717/127 |
| 7,805,717 B1* | 9/2010 | Spertus | G06F 8/48 | 717/130 |
| 8,060,858 B2* | 11/2011 | Mitrov | G06F 9/44521 | 717/107 |
| 8,255,931 B2* | 8/2012 | Sandoval | G06F 9/4812 | 717/162 |
| 8,261,244 B2* | 9/2012 | Pietrek | G06F 11/3466 | 717/130 |
| 8,443,354 B1* | 5/2013 | Satish | G06F 9/44536 | 717/104 |
| 8,468,552 B2* | 6/2013 | Brown | G06F 9/45516 | 711/206 |
| 8,695,022 B2* | 4/2014 | Henderson | G06F 9/4484 | 719/328 |
| 8,788,950 B2* | 7/2014 | Ivashin | G06F 3/038 | 715/753 |
| 8,954,929 B2* | 2/2015 | Braude | G06F 11/3688 | 717/124 |
| 8,966,511 B2* | 2/2015 | Kim | G06F 9/44521 | 719/331 |
| 8,978,053 B2* | 3/2015 | Clark | G06F 9/44521 | 719/331 |
| 9,348,625 B2* | 5/2016 | Murray | G06F 9/45516 | |
| 9,465,712 B2* | 10/2016 | Thomas | G06F 17/5009 | |
| 9,703,657 B1* | 7/2017 | Havemose | G06F 11/1446 | |
| 2002/0092003 A1* | 7/2002 | Calder | G06F 21/126 | 717/138 |
| 2002/0178271 A1* | 11/2002 | Graham | G06F 21/6245 | 709/229 |
| 2007/0283331 A1* | 12/2007 | Pietrek | G06F 11/3466 | 717/130 |
| 2009/0249368 A1* | 10/2009 | Needamangala | G06F 11/3644 | 719/328 |
| 2010/0095281 A1* | 4/2010 | Raber | G06F 11/362 | 717/129 |
| 2012/0304160 A1* | 11/2012 | Soeder | G06F 9/4486 | 717/148 |
| 2014/0047461 A1* | 2/2014 | Lee | G06F 9/44521 | 719/331 |
| 2014/0282431 A1* | 9/2014 | Delio, Jr. | G06F 11/3466 | 717/130 |
| 2017/0017528 A1* | 1/2017 | Hua | G06F 9/542 | |
| 2017/0132025 A1* | 5/2017 | Delio, Jr. | G06F 9/44521 | |

\* cited by examiner

TECHNIQUES OF ADDING SECURITY PATCHES TO EMBEDDED SYSTEMS

BACKGROUND

Field

The present disclosure relates generally to embedded-system devices, and more particularly, to techniques of system-wide interception of software functions to circumvent or prevent embedded system attacks due to legacy software function flaws.

Background

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

As embedded systems become more ubiquitous using open-source code libraries, security attacks have become more prevalent, with the learned attack vectors being used against public facing embedded systems. Accordingly, there is a need for an improved mechanism to address security patches, allowing precise replacement of vulnerable function calls in a manner that speeds up deployment and minimizes development and system testing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be an embedded-system device. The embedded-system device intercepts a call to a target function in a system dynamic library. The embedded-system device invokes an intermediate function in an intercept dynamic library and corresponding to the target function. The embedded-system device refrains from calling the target function or calling the target function with one or more modified parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As embedded systems become more ubiquitous using open-source code libraries, security attacks have become more prevalent, with the learned attack vectors being used against public facing embedded systems.

The present disclosure presents a mechanism that may address security patches, allowing precise replacement of vulnerable function calls in a manner that speeds up deployment and minimizes development and system testing.

The mechanism may provide system-wide interception of software functions to circumvent or prevent embedded system attack due to legacy software function flaws. The mechanism may have benefits and advantages over the common practice of replacing entire system dynamic libraries. In particular, replacing only precise vulnerable functions reduces development, testing, and deployment time, often critical in widely used embedded systems where threats can be exploited as soon as they are found.

Figure 1:
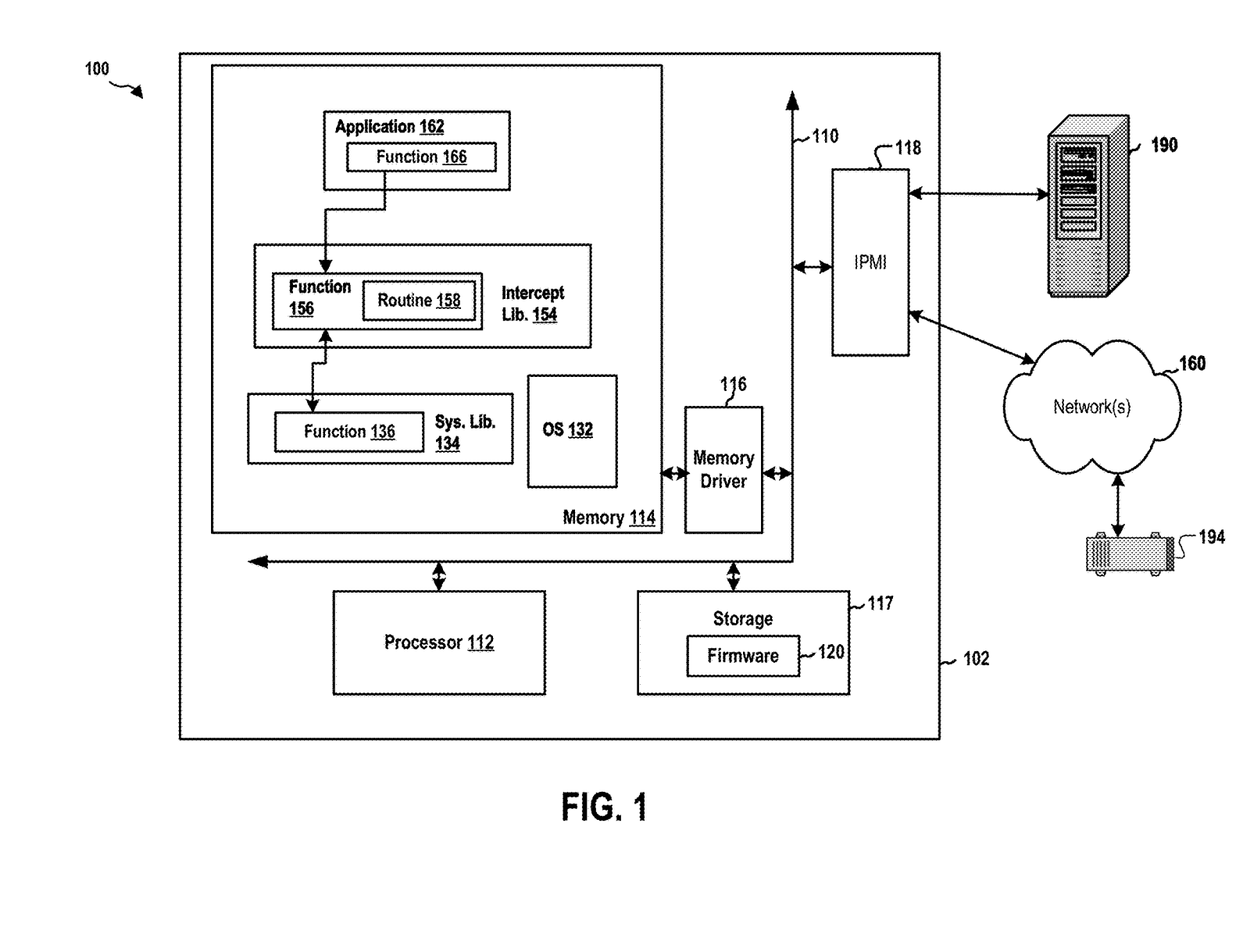
FIG. 1 is a diagram illustrating an embedded-system device.

FIG. 1 is a diagram 100 illustrating an embedded-system device 102. The embedded-system device 102 has a processor 112, a memory 114, a memory driver 116, and a storage 117. The embedded-system device 102 may support IPMI and may have an IPMI interface 118. For example, the embedded-system device 102 may be a baseboard management controller (BMC) that is in communication with, through the IPMI interface 118, a host computer 190 and/or a network device 194. The IPMI communication between the BMC and the network device 194 may be carried over a network 160. The BMC may manage the host computer 190.

Further, the storage 117 may store BMC firmware 120. When the processor 112 executes the BMC firmware 120, the processor 112 loads code and data of the BMC firmware 120 into the memory 114. This example shows that the memory 114 contains an (**operating system) OS 132, which utilizes a system dynamic library 134 and other system dynamic libraries, static libraries, etc. The system dynamic library 134 includes a system function 136 and other functions. These functions may provide common functionalities that can be utilized by applications of the embedded-system device 102 such as an application 162. More specifically, an application function 166 of the application 162 may call the system function 136 to perform certain tasks (e.g., obtaining a sensor value through IPMI).

The memory 114, the processor 112, the memory driver 116, the storage 117, and the IPMI interface 118 may be in communication with each other through a communication channel 110 such as a bus architecture.

In certain circumstances, one or more functions of the system dynamic library 134 may be vulnerable to security attacks or may include code that is not desirable. In particular, the system dynamic library 134 may be an Open Source library. Further, such an Open Source library may be not easily updated and, thus, improvements of such functions may not be easily distributed. In this example, the system function 136 is such a vulnerable function.

In certain configurations, during compilation or execution, when the application function 166 is programmed to call the system function 136, a system linker (e.g., of the OS 132) looks for the system function 136 in the system dynamic library 134 and links the application function 166 with the system function 136, thus causing the application function 166 to jump to the system function 136 contained in the system dynamic library 134.

In certain configurations, the system function 136 may be identified as containing undesirable code or as susceptible to attacks, and is considered as a target function. Similarly, other functions of the system dynamic library 134 may also be identified as target functions. An intercept dynamic library 154 may be generated and utilized, as described infra, to address some issues caused by the target functions. In particular, with respect to the system function 136, the intercept dynamic library 154 may include an intermediate function 156 that corresponds to the system function 136.

In one technique, the intermediate function 156 may have the same name as the system function 136. Further, the intercept dynamic library may be assigned an execution priority that is higher than an execution priority of the system dynamic library 134, such that the intercept dynamic library 154 is executed prior to an execution of the system dynamic library 134. In particular, a directive of the intercept dynamic library 154 may be added to a startup global environment of the OS 132. Thus, during compilation or execution, when the application function 166 is programmed to call the system function 136, the system linker looks for the name of the system function 136 in the intercept dynamic library 154 first, before it looks in the system dynamic library 134. As described supra, the intermediate function 156 has the same name as that of the system function 136. As such, the system linker links the application function 166 with the intermediate function 156, thus causing the application function 166 to jump to the intermediate function 156 contained in the intercept dynamic library 154. On the other hand, if a second function of the application 162 is programmed to call a second function of the system dynamic library 134 and the intercept dynamic library 154 does not contain a function corresponding to the second function of the system dynamic library 134, the system linker would link the second function of the application 162 with the second function of the system dynamic library 134, as the system linker would not be able to find a corresponding function in the intercept dynamic library 154 and would consequently move to the system dynamic library 134.

The intermediate function 156 of the intercept dynamic library 154 may include a routine 158. In this example, when the application function 166 calls the intermediate function 156 as described supra, the intermediate function 156 executes the routine 158. In certain configurations, the call from the application function 166 includes one or more parameters. The routine 158 may check the one or more parameters and determine whether the parameters can abuse the ability, or exploit the defects, of the system function 136. For example, the system function 136 may be a function that can be used to write data at given memory addresses including critical memory areas (e.g., the kernel space), as instructed by the parameters, without checking authorization of the application function 166.

In one technique, the routine 158 may check the parameters received with the call to the system function 136 and determines whether to modify the parameters based on a predetermined rule. In particular, the routine 158 may determine whether those parameters may pose a security risk. In the example described infra, the routine 158 may determine whether the memory addresses indicated by the parameters are in the critical areas and whether the application function 166 has an authorization. When needed, the routine 158 may modify the parameters such that the modified parameters indicate memory addresses outside the critical areas. Subsequently, the intermediate function 156 calls the system function 136 with the modified parameters. The intermediate function 156 may receive a return result from the system function 136, and will forward the return result to the application function 166.

In another technique, the routine 158 provides a functionality that substitutes the system function 136. That is, the routine 158 may execute code and may call functions of other libraries (including the system dynamic library 134) to perform the substitute functionality. Therefore, the routine 158 does not call the system function 136. Accordingly, when the routine 158 generates a return result and the application function 166 expects a return result, the intermediate function 156 returns the return result generated by the routine 158 to the application function 166.

In certain configurations, in both techniques described supra, from the perspective of the application function 166, the application function 166 may not know that the return result is from the intermediate function 156; the application function 166 perceives that the return result is received from the system function 136.

Figure 2:
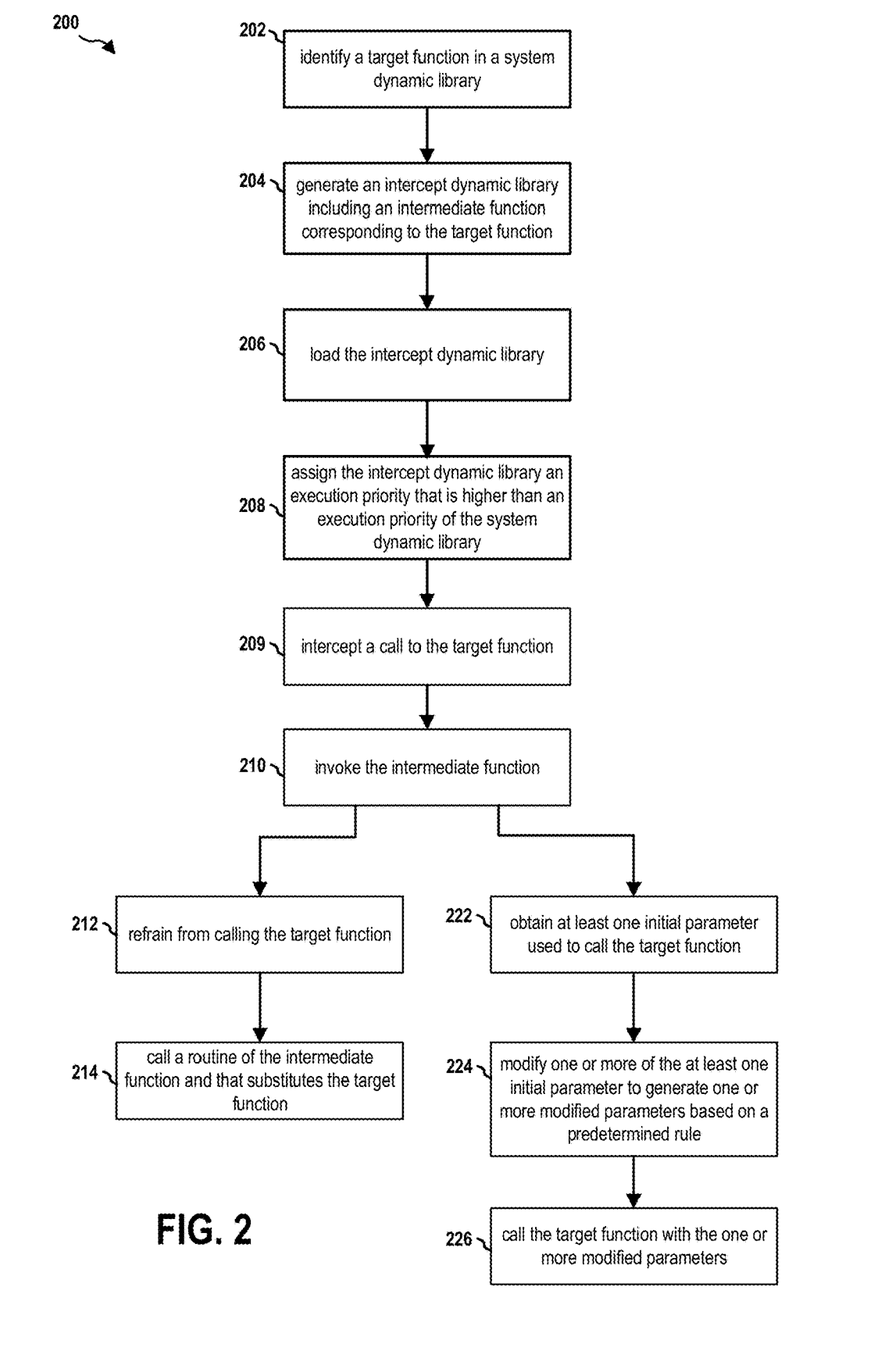
FIG. 2 is a flow chart of a method (process) for intercepting a function.

FIG. 2 is a flow chart 200 of a method (process) for intercepting a function. The method may be performed by an embedded-system device (e.g., the embedded-system device 102 and the apparatus 102').

At operation 202, a target function in a system dynamic library is identified (e.g., as vulnerable). At operation 204, an intercept dynamic library including an intermediate function corresponding to the target function is generated. At operation 206, the embedded-system device loads the intercept dynamic library. In certain configurations, the target function and the intermediate function have a same function name. At operation 208, the embedded-system device assigns the intercept dynamic library an execution priority that is higher than an execution priority of the system dynamic library such that the intercept dynamic library is executed prior to an execution of the system dynamic library. At operation 209, the embedded-system device intercepts a call to the target function. At operation 210, the embedded-system device invokes the intermediate function.

In one technique, the embedded-system device, at operation 212, refrains from calling the target function. At operation 214, the embedded-system device calls a routine of the intermediate function and that substitutes the target function when refraining from calling the target function.

In another technique, the embedded-system device, subsequent to operation 210 and at operation 222, obtains at least one initial parameter used to call the target function. At operation 224, the embedded-system device modifies one or more of the at least one initial parameter to generate one or more modified parameters based on a predetermined rule. At operation 226, the embedded-system device calls the target function with the one or more modified parameters.

In certain configurations, the assigning the intercept dynamic library the execution priority comprises adding a directive of the intercept dynamic library to a startup global environment of the embedded-system device. In certain configurations, the call to the target function is from an application of the embedded-system device.

Figure 3:
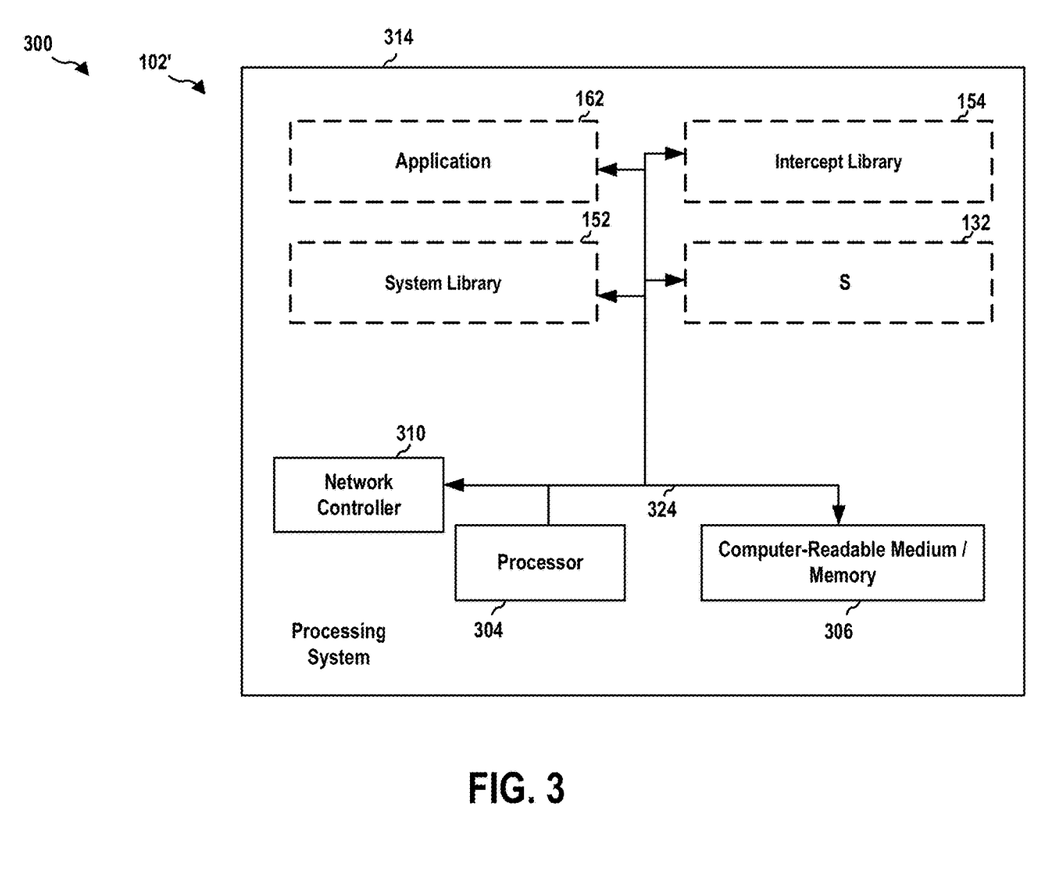
FIG. 3 is a diagram illustrating an example of a hardware implementation for an apparatus employing a processing system.

FIG. 3 is a diagram 300 illustrating an example of a hardware implementation for an apparatus 102' employing a processing system 314. The processing system 314 may be implemented with a bus architecture, represented generally by the bus 324. The bus 324 may include any number of interconnecting buses and bridges depending on the specific application of the processing system 314 and the overall design constraints. The bus 324 links together various circuits including one or more processors and/or hardware components, represented by the processor 304, the application 162, the intercept dynamic library 154, the system dynamic library 134, the OS 132, and the computer-readable medium/memory 306. In particular, the computer-readable medium/memory 306 may include the storage 117. The bus 324 may also link various other circuits such as timing sources, peripherals, voltage regulators, and power management circuits, which are well known in the art, and therefore, will not be described any further.

The processing system 314 may be coupled to a network controller 310. The network controller 310 provides a means for communicating with various other apparatus over a network. The network controller 310 receives a signal from the network, extracts information from the received signal, and provides the extracted information to the processing system 314, specifically the IPMI interface 118. In addition, the network controller 310 receives information from the processing system 314, specifically the IPMI interface 118, and based on the received information, generates a signal to be sent to the network. The processing system 314 includes a processor 304 coupled to a computer-readable medium/memory 306. The processor 304 is responsible for general processing, including the execution of software stored on the computer-readable medium/memory 306. The software, when executed by the processor 304, causes the processing system 314 to perform the various functions described supra for any particular apparatus. The computer-readable medium/memory 306 may also be used for storing data that is manipulated by the processor 304 when executing software. The processing system further includes at least one of the application 162, the intercept dynamic library 154, the system dynamic library 134, the OS 132. The components may be software components running in the processor 304, resident/stored in the computer readable medium/memory 306, one or more hardware components coupled to the processor 304, or some combination thereof.

The apparatus 102' may be configured to include means for performing each of the operations described supra referring to FIG. 2. The aforementioned means may be one or more of the aforementioned components of the apparatus 102 and/or the processing system 314 of the apparatus 102' configured to perform the functions recited by the aforementioned means.

Figure 4:
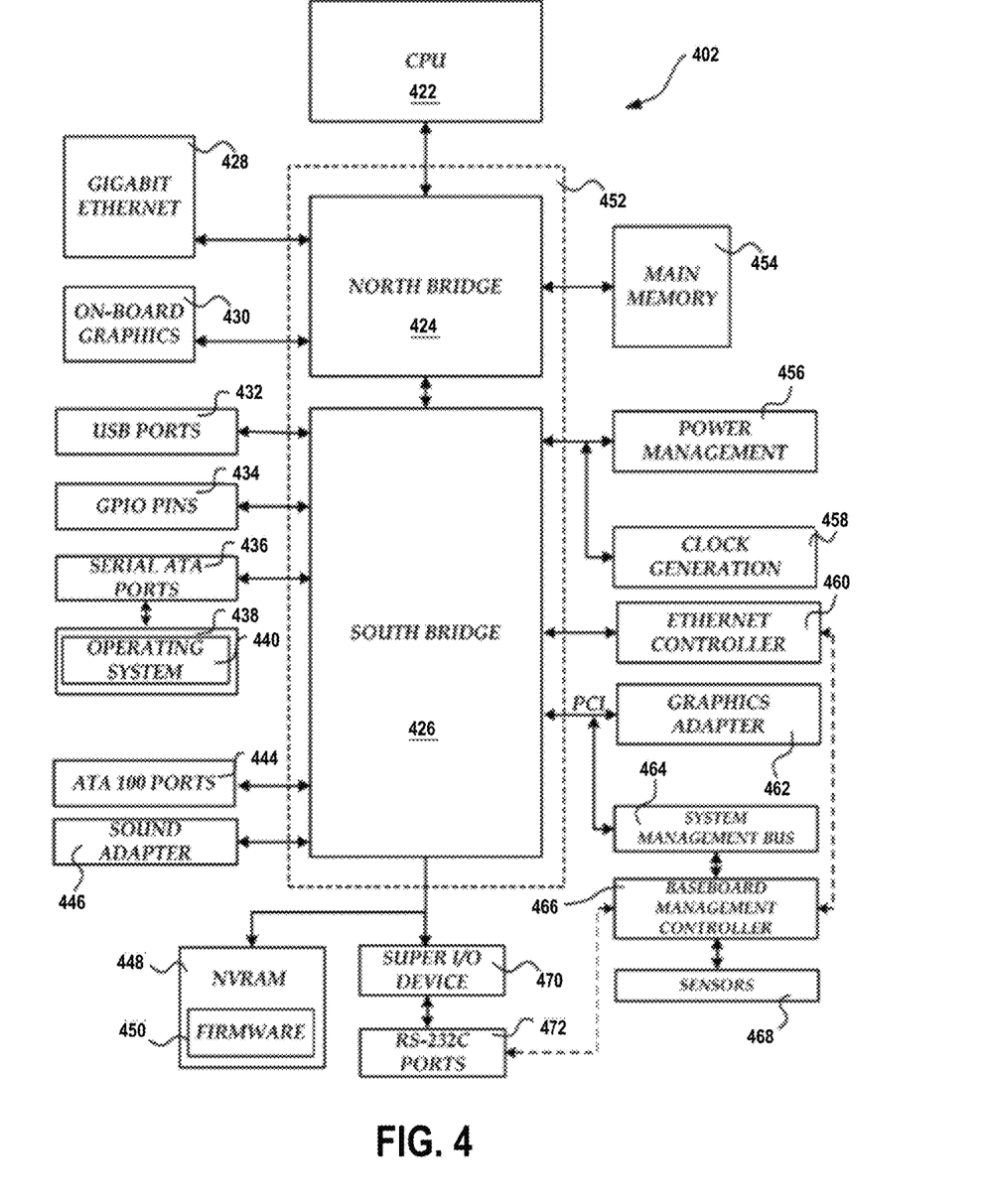
FIG. 4 shows a computer architecture for a computer.

FIG. 4 and the following discussion are intended to provide a brief, general description of one suitable computing environment in which aspects of the embodiments described herein may be implemented. In particular, FIG. 4 shows a computer architecture for a computer 402 that may be utilized to embody the host computer 190, as described supra. It should be appreciated that the computer architecture shown in FIG. 4 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 402 shown in FIG. 4 includes a baseboard, or "motherboard," which is a printed circuit board to which a multitude of components or devices may be connected by way of a system bus or other electrical communication path. In one illustrative embodiment, a CPU 422 operates in conjunction with a chipset 452. The CPU 422 is a standard central processor that performs arithmetic and logical operations necessary for the operation of the computer. The server computer 402 may include a multitude of CPUs 422.

The chipset 452 includes a north bridge 424 and a south bridge 426. The north bridge 424 provides an interface between the CPU 422 and the remainder of the computer 402. The north bridge 424 also provides an interface to a random access memory ("RAM") used as the main memory 454 in the computer 402 and, possibly, to an on-board graphics adapter 430. The north bridge 424 may also include functionality for providing networking functionality through a gigabit Ethernet adapter 428. The gigabit Ethernet adapter 428 is capable of connecting the computer 402 to another computer via a network. Connections which may be made by the network adapter 428 may include LAN or WAN connections. LAN and WAN networking environments are commonplace in offices, enterprise-wide computer networks, intranets, and the internet. The north bridge 424 is connected to the south bridge 426.

The south bridge 426 is responsible for controlling many of the input/output functions of the computer 402. In particular, the south bridge 426 may provide one or more USB ports 432, a sound adapter 446, an Ethernet controller 460, and one or more GPIO pins 434. The south bridge 426 may also provide a bus for interfacing peripheral card devices such as a graphics adapter 462. In one embodiment, the bus comprises a PCI bus. The south bridge 426 may also provide a system management bus 464 for use in managing the various components of the computer 402. Additional details regarding the operation of the system management bus 464 and its connected components are provided below.

The south bridge 426 is also operative to provide one or more interfaces for connecting mass storage devices to the computer 402. For instance, according to an embodiment, the south bridge 426 includes a serial advanced technology attachment ("SATA") adapter for providing one or more SATA ports 436 and an ATA 100 adapter for providing one or more ATA 100 ports 444. The SATA ports 436 and the ATA 100 ports 444 may be, in turn, connected to one or more mass storage devices such as the SATA disk drive 438 storing an operating system 440 and application programs.

As known to those skilled in the art, an operating system 440 comprises a set of programs that control operations of a computer and allocation of resources. An application program is software that runs on top of the operating system software, or other runtime environment, and uses computer resources to perform application specific tasks desired by the user. According to one embodiment of the invention, the operating system 440 comprises the LINUX operating system. According to another embodiment of the invention the operating system 440 comprises an operating system within the WINDOWS family of operating systems from MICROSOFT CORPORATION. According to another embodiment, the operating system 440 comprises the UNIX, LINUX, or SOLARIS operating system. It should be appreciated that other operating systems may also be utilized.

The mass storage devices connected to the south bridge 426, and their associated computer storage media, provide non-volatile storage for the computer 402. Although the description of computer storage media contained herein refers to a mass storage device, such as a hard disk or CD-ROM drive, it should be appreciated by those skilled in the art that computer storage media can be any available media that can be accessed by the computer 402.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 426 for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the firmware 450 that includes program code containing the basic routines that help to start up the computer 402 and to transfer information between elements within the computer 402.

As described briefly above, the south bridge 426 may include a system management bus 464. The system management bus 464 may include a BMC 466. The BMC 466 may be the embedded-system device 102. In general, the BMC 466 is a microcontroller that monitors operation of the computer system 402. In a more specific embodiment, the BMC 466 monitors health-related aspects associated with the computer system 402, such as, but not limited to, the temperature of one or more components of the computer system 402, speed of rotational components (e.g., spindle motor, CPU Fan, etc.) within the system, the voltage across or applied to one or more components within the system 402, and the available or used capacity of memory devices within the system 402. To accomplish these monitoring functions, the BMC 466 is communicatively connected to one or more components by way of the management bus 464. In an embodiment, these components include sensor devices 468 for measuring various operating and performance-related parameters within the computer system 402. The sensor devices 468 may be either hardware or software based components configured or programmed to measure or detect one or more of the various operating and performance-related parameters.

It should also be appreciated that the computer 402 may comprise other types of computing devices, including handheld computers, embedded computer systems, personal digital assistants, and other types of computing devices known to those skilled in the art. It is also contemplated that the computer 402 may not include all of the components shown in FIG. 4, may include other components that are not explicitly shown in FIG. 4, or may utilize an architecture completely different than that shown in FIG. 4.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating an embedded-system device, comprising:
   identifying a target function;
   in response to identifying the target function, generating an intercept dynamic library including an intermediate function corresponding to the target function;
   intercepting a call to the target function in a system dynamic library;
   loading the intercept dynamic library, wherein the target function and the intermediate function have a same function name;
   assigning the intercept dynamic library an execution priority that is higher than an execution priority of the system dynamic library such that the intercept dynamic library is executed prior to an execution of the system dynamic library, wherein the assigning the intercept dynamic library the execution priority comprises adding a directive of the intercept dynamic library to a startup global environment of the embedded-system device;
   invoking the intermediate function in the intercept dynamic library and corresponding to the target function; and
   refraining from calling the target function or calling the target function with one or more modified parameters.

2. The method of claim 1, further comprising:
   calling a routine of the intermediate function and that substitutes the target function when refraining from calling the target function.

3. The method of claim 1, further comprising:
   obtaining at least one initial parameter used to call the target function; and
   modifying one or more of the at least one initial parameter to generate the one or more modified parameters based on a predetermined rule.

4. The method of claim 1, wherein the call to the target function is from an application of the embedded-system device.

5. An apparatus, the apparatus being an embedded-system device, comprising:
   a memory; and
   at least one processor coupled to the memory and configured to:
      identify a target function;
      in response to identifying the target function, generate an intercept dynamic library including an intermediate function corresponding to the target function;
      intercept a call to the target function in a system dynamic library;
      load the intercept dynamic library, wherein the target function and the intermediate function have a same function name;
      assign the intercept dynamic library an execution priority that is higher than an execution priority of the system dynamic library such that the intercept dynamic library is executed prior to an execution of the system dynamic library, wherein to assign the intercept dynamic library the execution priority comprises, the at least one processor is further configured to add a directive of the intercept dynamic library to a startup global environment of the embedded-system device;
      invoke the intermediate function in the intercept dynamic library and corresponding to the target function; and refrain from calling the target function or call the target function with one or more modified parameters.

6. The apparatus of claim 5, wherein the at least one processor is further configured to:
call a routine of the intermediate function and that substitutes the target function when refraining from calling the target function.

7. The apparatus of claim 5, wherein the at least one processor is further configured to:
obtain at least one initial parameter used to call the target function; and
modify one or more of the at least one initial parameter to generate the one or more modified parameters based on a predetermined rule.

8. The apparatus of claim 5, wherein the call to the target function is from an application of the embedded-system device.

9. A non-transitory computer-readable medium storing computer executable code for operating an embedded-system device, comprising code to:
identify an target function;
in response to identifying the target function, generate an intercept dynamic library including an intermediate function corresponding to the target function;
intercept a call to the target function in a system dynamic library;
load the intercept dynamic library, wherein the target function and the intermediate function have a same function name;
assign the intercept dynamic library an execution priority that is higher than an execution priority of the system dynamic library such that the intercept dynamic library is executed prior to an execution of the system dynamic library, wherein to assign the intercept dynamic library the execution priority comprises, the code is further configured to add a directive of the intercept dynamic library to a startup global environment of the embedded-system device;
invoke the intermediate function in the intercept dynamic library and corresponding to the target function; and
refrain from calling the target function or call the target function with one or more modified parameters.

10. The non-transitory computer-readable medium of claim 9, wherein the code is further configured to:
call a routine of the intermediate function and that substitutes the target function when refraining from calling the target function.

11. The non-transitory computer-readable medium of claim 9, wherein the code is further configured to:
obtain at least one initial parameter used to call the target function; and
modify one or more of the at least one initial parameter to generate the one or more modified parameters based on a predetermined rule.

* * * * *